June 2, 1925.  1,539,896

L. W. CLAYBOURN

MEASURING APPARATUS

Filed Feb. 10, 1923  4 Sheets-Sheet 1

Inventor:

June 2, 1925.　　　　　　　　　　　　　　　　　　　1,539,896
L. W. CLAYBOURN
MEASURING APPARATUS
Filed Feb. 10, 1923　　　　4 Sheets-Sheet 2

Inventor:
Leslie W. Claybourn,
by his Attorney.

June 2, 1925.  
L. W. CLAYBOURN  
1,539,896  
MEASURING APPARATUS  
Filed Feb. 10, 1923  
4 Sheets-Sheet 3

June 2, 1925.  
L. W. CLAYBOURN  
MEASURING APPARATUS  
Filed Feb. 10, 1923  
1,539,896  
4 Sheets-Sheet 4

Inventor:
Leslie W. Claybourn,
by his Attorney.

Patented June 2, 1925.

1,539,896

UNITED STATES PATENT OFFICE.

LESLIE W. CLAYBOURN, OF MILWAUKEE, WISCONSIN.

MEASURING APPARATUS.

Application filed February 10, 1923. Serial No. 618,255.

*To all whom it may concern:*

Be it known that I, LESLIE W. CLAYBOURN, a citizen of the United States, residing at Milwaukee, in the county of Milwaukee, State of Wisconsin, have invented certain new and useful Improvements in Measuring Apparatus, of which the following is a specification.

My invention relates to measuring apparatus intended for measuring the dimensions of objects while under pressure in order that the working dimensions of the objects may be ascertained.

It is the object of my invention to provide novel means for applying pressure to an object being measured, so that the opposed surfaces concerned in the measuring function of the object shall be placed under conditions similar to working conditions; further, to provide novel means whereby the object being measured is, at the portion being measured, caused to assume its correct form, either flat or curved or other form which the object may normally have under working conditions, and to provide novel means for measuring the dimension of the object in such condition; further, to provide novel means in which gaging means and pressure means for the objects being measured are associated; and the invention will be further readily understood from the following description and claims, and from the drawings, in which latter:

Fig. 1 is a front elevation of an apparatus exemplifying my invention employed in measuring a curved object having substantially great curvature.

Fig. 2 is a side elevation of the same.

It is desirable in various arts to ascertain the true dimensions of objects under working pressures, and I have exemplified my invention as applied to measuring the thicknesses of printing plates used in the printing art for printing on paper, card-board, or the like.

Printing plates of the character mentioned are usually mounted on plate cylinders, on printing beds, or on printing bases, during the printing operation, and it is desirable for best working conditions that the printing plates be of uniform thickness throughout their printing areas and with each other, under working conditions, that is to say, during the printing operation, this printing operation causing a printing contact between the printing plate and the paper being printed to transfer the ink, with which the printing surface of the printing plate has been supplied, to the paper being printed. It is desirable further that these dimensions be obtained between points opposite each other in the respective portions of the printing plate, or other object being measured, and that all hollows under the object being measured, and all wavy conditions of said object at the portions being measured, be removed during the measuring of the object in order to obtain its true dimensions.

In order to accomplish the objects and to meet the conditions mentioned, I have provided an apparatus of extreme accuracy and having a range for measuring flat objects, curved objects of different curvatures, and objects of various shapes and dimensions, and have provided an apparatus of such capacity that objects may be measured whether they be thick or thin, or placed in the device flatwise, edgewise or endwise for measuring the same.

There is, for instance, a frame 21 which comprises legs 22 and a table 23 to which the legs are rigidly bolted, as by bolts 24 for forming a rigid structure. The legs may be provided with suitable rollers 25 for rolling the apparatus along the floor to suitable positions of use. The table is shown as a massive structure for extreme rigidity and is shown provided with aprons 26 at its edges and cross ribs 27 and 28. It has a supporting plate 29 integral therewith having a supporting surface 30 for the object being measured. The objects being measured are exemplified as a curved printing plate 31 of greater curvature in Figs. 1 and 2, as a curved printing plate 32 of less curvature in Fig. 3, and as a flat printing plate 33 in Fig. 4.

Figures 1, 2, 12:
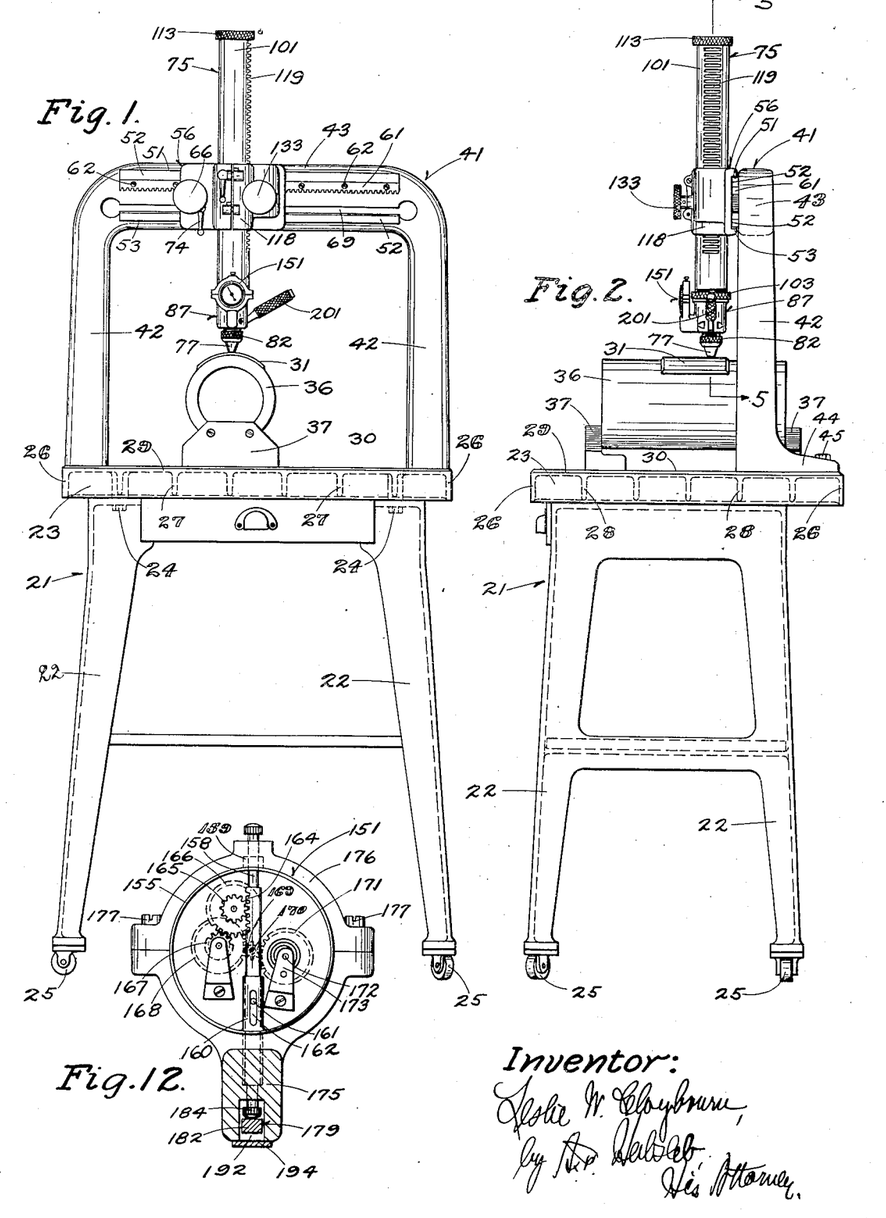
Figure 3:
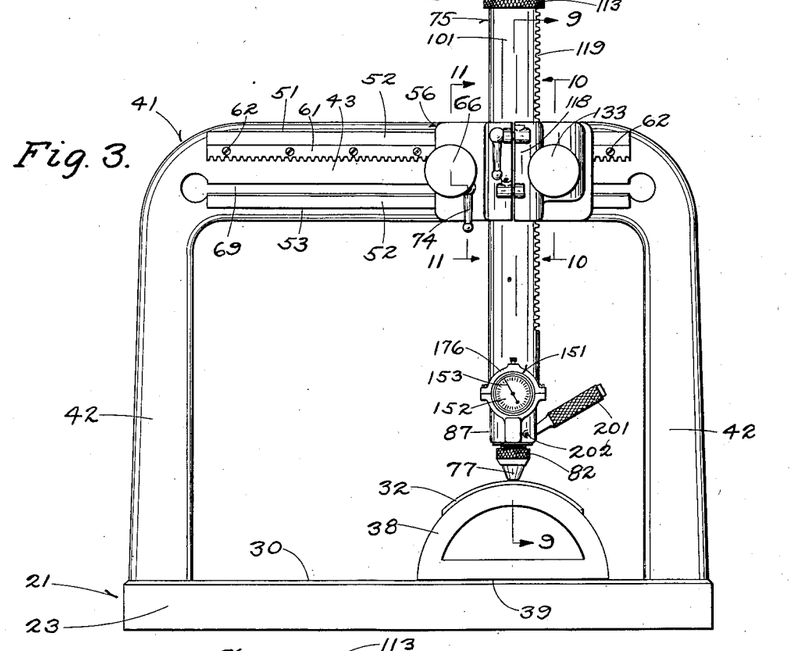
Fig. 3 is an enlarged front elevation of my improved apparatus shown employed in measuring a curved object of less curvature, and showing the parts in differently adjusted positions.
Figure 4:
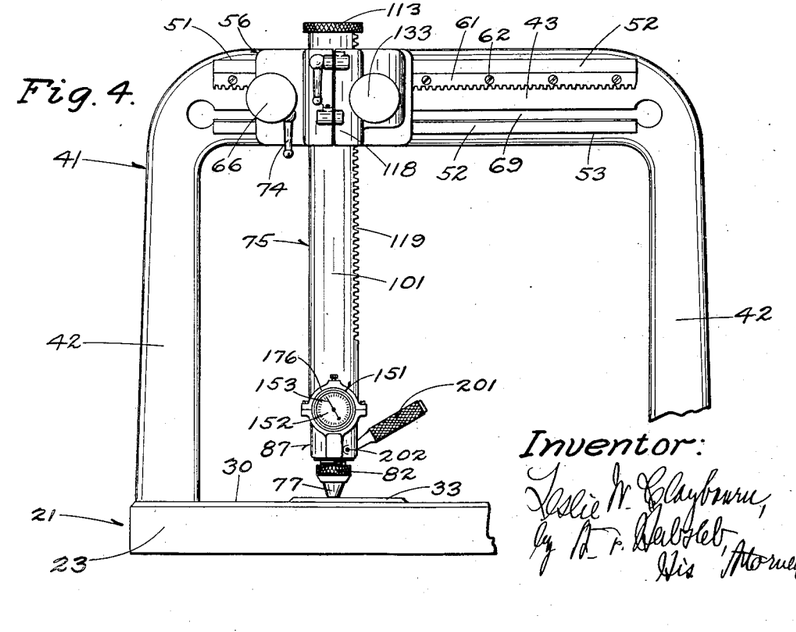
Fig. 4 is a front elevation showing the apparatus employed in measuring a flat object.

The object being measured may be supported directly on the supporting surface, as shown in Fig. 4, or saddles of suitable form to receive the object may be provided. Such a saddle is shown in Figs. 1 and 2 as comprising a cylinder 36 supported by blocks 37 to which the cylinder is secured, the axis of the cylinder and the supporting face of the table being parallel with each other. A saddle 38 is shown in Fig. 3 on which a printing plate of less curvature is received, the saddle being the sector of a cylinder and having a supporting face 39, which is a plane to coact with the plane of the supporting surface of the table, which planes and the face of the sector of the cylinder parallel with its axis are parallel with each other.

The curved printing plates, when being measured, may be positioned on the curved surfaces of their supports, and be shifted on such curved surfaces lengthwise of their axes, or transversely on said curved surfaces, to present the various portions of the printing plates to the measuring device without changing the positions of the saddles, or the saddles may be shifted on the table.

The table is also of sufficient extent so that the objects being measured may be moved thereacross and during such movements remain in parallelism with the table, so that the various portions of the objects may be measured. I have also shown the measuring head adjustable to different heights above the table and to different positions crosswise of the table to enhance the range of the device and to reach various portions of the objects being measured in convenient manner.

A yoke 41 extends upwardly from the frame and is exemplified as an integral structure having standards 42 and a cross-rail 43, the latter shown integral with the standards. The yoke is exemplified as cored for strength and rigidity. The yoke is provided with feet 44, having substantial contacting areas with the table, and secured to the table by means of bolts 45, for forming the table and the yoke as a rigid structure, in order that yield therebetween may be avoided and accuracy of measurements obtained.

The cross-rail is provided with a guideway comprising guiding faces 51, 52, 53, the guiding face 51 having a groove 54 therein in which keys 55 in a slide 56 are received. A gib 57 is caused to coact with the guiding face 53 by means of suitable adjusting screws 58. The construction is such that the slide has accurate guided movement lengthwise of the cross-rail with relation to the supporting surface of the table, such movement being parallel to such supporting surface and the slide being maintained perpendicular to said supporting surface.

Movement of the slide lengthwise of the guideway is shown accomplished by providing a rack 61 extending lengthwise of and parallel to the guideway. The rack is secured to the cross-rail by screws 62. The rack is meshed by a pinion 63 fixed to a shaft 64 journaled in a bearing 65 in the slide, and having a hand-wheel 66 secured thereto. Turning of the hand-wheel causes rotation of the pinion lengthwise of the rack and movement of the slide lengthwise of its guideway.

When the slide has been moved into its adjusted position, it is clamped in such position by a clamp, shown comprising a T-slot 69 extending lengthwise of the cross-rail, in which the head 70 of the T-bolt 71 is received, the T-bolt being supported in a bearing 72 in the slide. A nut 73 having a handle 74 thereon is arranged to clamp the slide to the cross-rail between the head of the bolt and its nut.

Figures 5, 6, 7, 8:
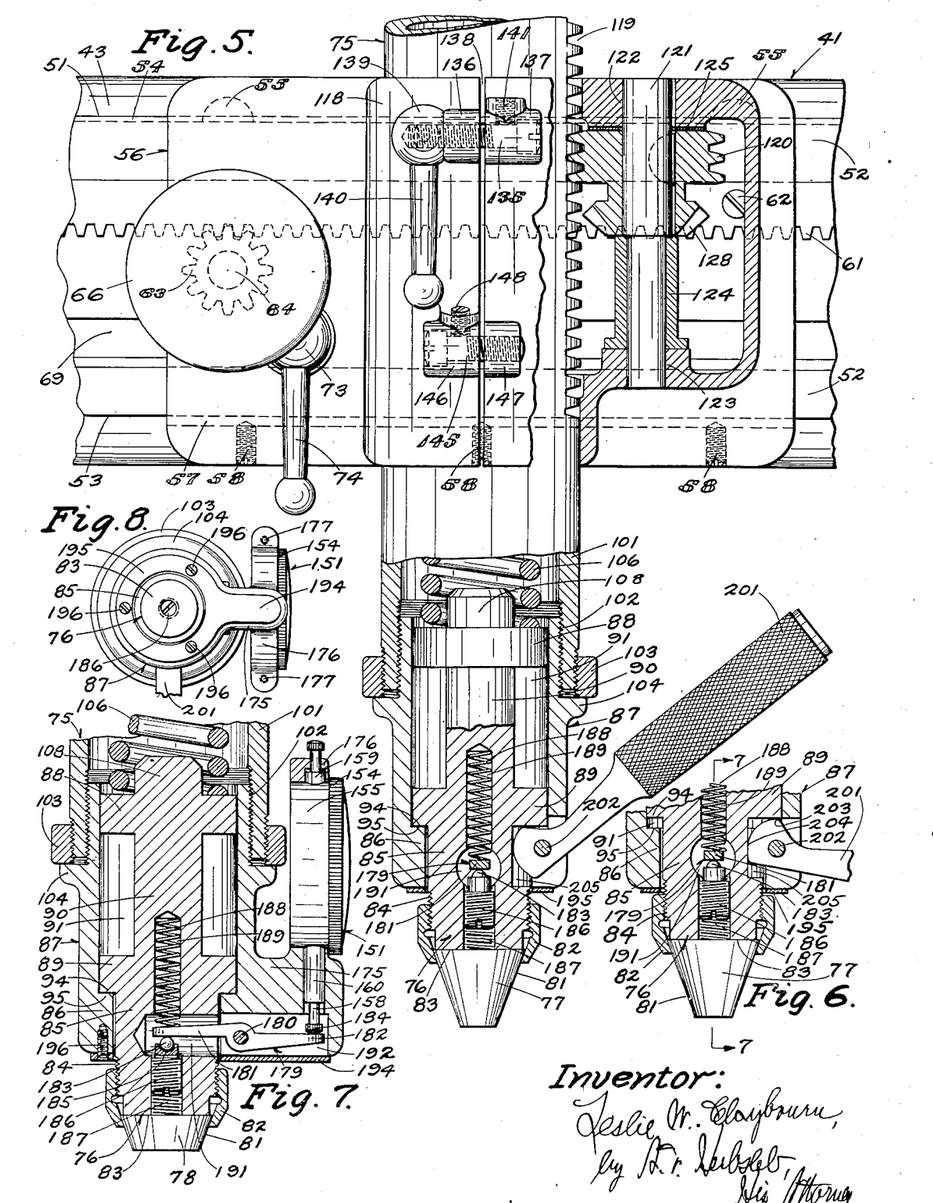
Fig. 5 is an enlarged front detail view of my improved apparatus, partly broken away, and partly in section on the line 5—5 of Fig. 2, and showing the pressure-part in lowered position.
Fig. 6 is a vertical axial section of the lower parts shown in Fig. 5 but showing the pressure-part in manually raised position.
Fig. 7 is a vertical axial section of the lower portion of my improved apparatus, taken in the plane of the line 7—7 of Fig. 6.
Fig. 8 is a bottom view of the pressure-head, with its pressure-shoe and the clamp-ring therefor removed.
Figure 9:
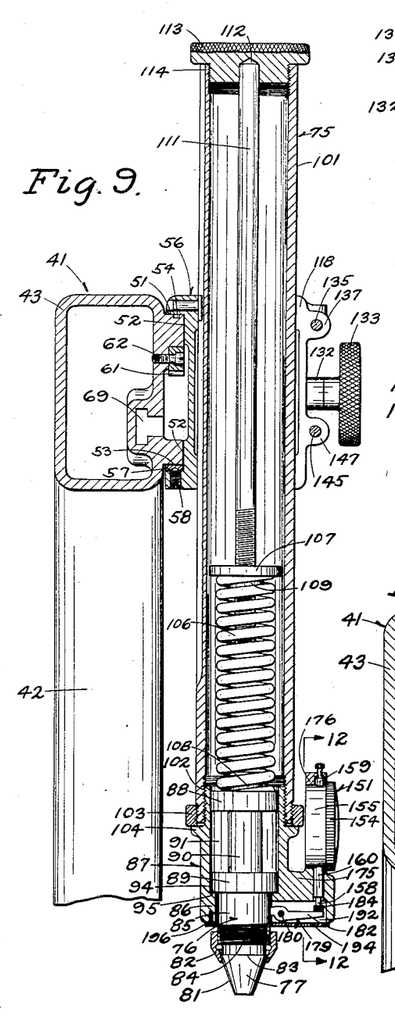
Fig. 9 is a vertical axial section taken on the line 9—9 of Fig. 3, partly broken away.
Figure 10:
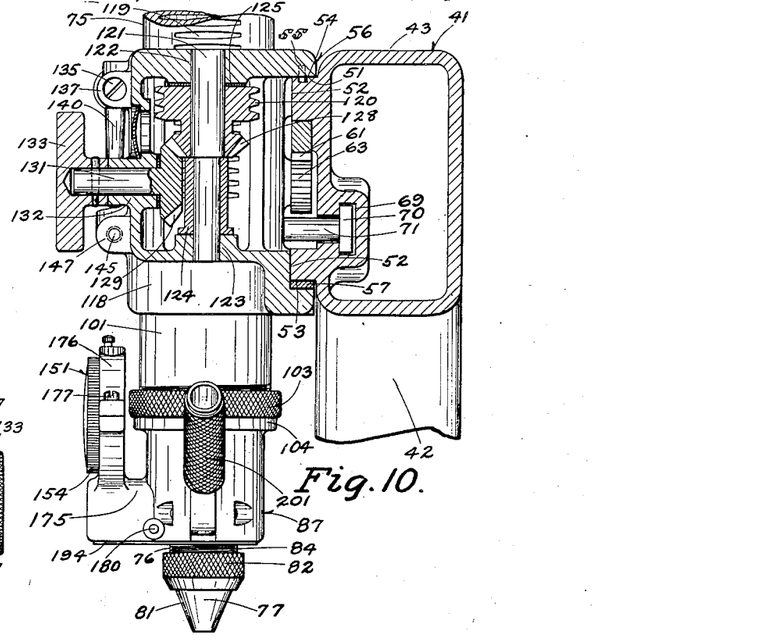
Fig. 10 is a cross-section of the same taken on the line 10—10 of Fig. 3, partly broken away and showing the vertical guide raised.
Figure 11:
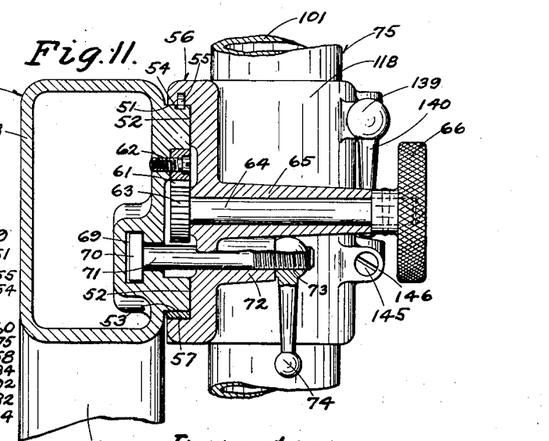
Fig. 11 is a cross-section of the same taken on the irregular line 11—11 of Fig. 3; and, Fig. 12 is a cross-section taken on the line 12—12 of Fig. 9, with the rear wall of the indicating gage removed for exposure of the interior mechanism.

A guide 75 is supported in the slide, and is provided with a pressure-part 76 comprising a pressure-shoe 77. Pressure-shoes of various kinds may be releasably and interchangeably secured to the pressure-part. One of such pressure-shoes is shown at 77, and another form of pressure-shoe is shown at 78 in Fig. 7. Other forms may be provided. The pressure-shoes are provided with conical peripheries, as shown at 81, with which the inner conical face of a chucking ring 82 coacts, to draw and clamp the shoe against the lower end face 83 of the pressure-part, by coaction between the threaded inner periphery of said chucking ring and the lower threaded end 84 of said pressure-part.

The pressure-part is exemplified as an axially movable part, having an outer shank 85 in a bearing 86 of a pressure-head 87, and having bearing flanges 88, 89, connected by a shank 90, and movable axially in the hollow 91 of said head, the flanges being guided by the wall of said hollow or bore.

The pressure-part is exemplified as a round part. It is provided with an annular shoulder 94, arranged to coact with an annular shoulder 95 in the hollow of said pressure-head, to limit outward movement of the pressure-part.

The hollow guide is exemplified as comprising a tube 101, having threaded connection 102 with said head. A collar 103 is threaded to the outer lower end of the tube, and is clamped against an annular flange 104 on said head, for rigidly securing said head and tube together in axial alinement.

The means for exerting pressure upon the pressure-part are exemplified as comprising a helical spring 106, which is located between the pressure-part and a coacting part in the tube, exemplified as a disk 107. The pressure-part is shown as having a central boss 108 and the disk as having a central boss 109, the ends of the spring being received about said bosses. This boss 109 is internally threaded for coaction with the threaded portion of a screw-rod 111. The outer end of the screw-rod is received in a socket 112 of a cap 113, shown as having threaded connection 114 with the outer end of said tube. Adjustment of the disk on the screw-rod adjusts the tension of the spring, for adjusting the pressure exerted by the pressure-part upon the object being measured.

This pressure may be sufficient to overcome any yield in position or texture of the body being measured, and preferably imparts a working pressure to said object to simulate the working pressure to which said object is subjected during working condition, for instance, in the case of a printing plate, to the printing pressure to which said plate is subjected in the printing operation.

In order to adjust the pressure-part to properly act upon the object being measured. I provide means for adjusting the pressure-part in directions perpendicular to the supporting surface of the printing plate and parallel with said surface, in order that the measurements may be taken as the results of movements of the parts in right lines, to avoid inaccuracy and insure definite results.

Thus the vertically movable guide is adjustable in a clamp-bearing 118, the guiding surfaces of which are perpendicular to the supporting surface of the table. Axial movement of the guide is accomplished by providing the guide with a rack 119, with the teeth of which a worm 120 meshes. The worm is on a shaft 121, located in bearings 122, 123, of the slide, and held in operative position by a bushing 124 and a washer 125.

A bevel-gear 128 is fast with the worm, and is meshed by a bevel-gear 129 on a shaft 131 journaled in a bearing 132 of the slide. A hand-wheel 133 is fixed to this shaft. The parts are so arranged that proper meshing relation between the bevel-gears is provided and endwise movement of the shaft 131 is avoided.

The means for clamping the clamp-bearing about the tubular guide is shown as comprising a screw 135 received through the cheeks 136, 137, at the respective sides of the split 138 in said bearing. A nut 139 is received over the threaded end of said screw and has a handle 140 thereon. Turning of the nut in one direction releases the clamping action of the clamp-bearing, and turning said nut in the opposite direction clamps said clamp-bearing about said guide. In order that the handle of the nut may be in a given position during clamped relation of the parts, a set-screw 141 is threaded into the cheek 137 and impinges the screw, to hold the screw in proper rotated condition to effect the clamping action when the handle is, for instance, in down position.

In order to limit separation between the walls of the split in the bearing, for maintaining proper sliding friction between the bearing and the guide, I provide a screw 145, journaled in a cheek 146 on one wall of said split, and threaded into a cheek 147 on the other wall of said split, for adjusting the frictional engagement of the split-bearing upon the tubular guide. A set-screw 148 threaded in the cheek 146, clamps the adjusting screw in adjusted position.

A suitable gage 151 comprises a dial 152 and an indicating finger 153. The dial is on a ring 154 rotatable on the casing 155 of the gage, for placing any of the graduations of the dial in registry, as at zero, with the finger for normal or true thickness of the objects being measured. The variations of the finger to one side or the other of such positioned graduation indicates the variation of the object being measured from its desired true dimension, the movement of the finger to one side of the normal or true graduation showing, for instance, a thickness of the object being measured less than the normal or true thickness. The location of said finger at the other side of said graduation indicates an over-variation of the object being measured.

The gage is provided with suitable means for actuating the finger, exemplified as an actuating stem 158 slidable in bearings 159, 160, in the casing 155. The stem is guided by a pin 161, moving in a slot 162 in the bearing 160, to prevent rotation of the stem.

The stem is provided with a rack 164 meshing with a pinion 165, having a gear 166 fast therewith, which latter meshes with a pinion 167 having a gear 168 fast therewith. The gear 168 meshes with a gear 169, which has a shaft 170 extending therefrom, on which the indicating finger 153 is secured. The gear 169 meshes with a gear 171 on a shaft 172 to which one end of a spiral spring 174 is secured, the other end of the spiral spring being secured to a housing 173 inclosing the spring, the housing being secured to the frame or casing. The shafts of the gears and pinions are suitably journaled in the casing. The spring maintains meshing engagement between the teeth of the gears, pinions and rack, and acts counter to the measuring movement of the actuating stem in order to prevent lost motion and insure accurate indications of measurements.

The head 87 of the guide 75 is provided with a bracket 175, having thereon a split securing ring 176, between the separable portions of which the gage is secured. The parts of the split ring are secured together by means of screws 177.

Motion is communicated between the pressure-part 76 and the actuating member of the indicating gage, instanced as accomplished by a lever 179 pivoted on a pin 180 in the head 87, and provided with arms 181, 182. The pressure-part is provided with a contact-part 183 for the arm 181. The arm 182 is arranged to contact the knob 184 of the actuating part of the gage. The contact-part 183 is shown as a small ball, and the knob is provided with a rounded contact-face for the arm 182. The points of contact of the arms of the lever with the pressure-part and the actuating part, respectively, are equidistant from the pivot of the lever, so that the motion imparted by the pressure-part is communicated accurately to the actuating part of the gage.

The ball 183 is shown seated in a seat 185 in the end of an adjusting screw 186, threaded into a threaded bore 187 of the pressure-part. A spring 188 is received in a recess 189 of said pressure-part, and bears upon the arm 181 to form intimate contact between the latter and the contact-part 183. The contact-part and spring are shown axially arranged in the pressure-part.

The pressure-part is provided with a laterally extending recess 191, and the head 87 is provided with a coincident laterally extending recess 192, the lever 179 being located in these recesses. A closing plate 194 is arranged to close the recess in the head, and is provided with a ring 195 received about the pressure-part and secured to the head by means of screws 196. The pressure-part, the lever and the actuating part move in closed cavities to maintain the parts clean.

In order to raise the pressure-part manually, for instance, for inserting an object to be measured thereunder, I provide a lever 201 pivoted on a pin 202 in the head, and having an actuating face 203 and a cam-face 204. The actuated end of the lever is received in a lateral recess 205 in the pressure-part, the upper wall of this recess being coincident with or above the annular shoulder 94. Depression of the outer end of the lever causes raising of the pressure-part and the parts are so arranged that when the outer end of the lever is in depressed position, the advancing end of the cam-face is in contact with the upper wall of the recess at a point above the pivot of the lever which is in a line intersecting said pivot and parallel with the axis of the pressure-part, so as to automatically hold the pressure-part in raised position. (See Figs. 5 and 6.) In this relation of parts the rear end of the cam-face is in contact with the inner wall of the recess, to act as a stop for lifting the movement of the lever.

Suitable standard gages are provided for determining accurate dimensions. Instancing such gages for the printing industry, they may represent respectively measurements of from 1 to 18 points, inclusive, each point being the equal of .01383 inches. Other standard gages of standard dimensions may also be provided, depending on the use to which the device is put and the character of objects being measured.

In employing my improved device, and assuming that printing plates such as exemplified in Fig. 4 are to be measured, a standard gage having accurate dimension of thickness desired in the printing plate is placed on the table 23 at a suitable point at which the printing plates may be placed so as to bring the various portions of the printing plates under the pressure-part.

The slide 56 is adjusted laterally for lateral positioning of the pressure-part, the slide being clamped to the cross-bar when adjusted. The vertical guide 75 is adjusted by means of the hand-wheel 133 so as to lower the pressure-part to the desired position with relation to the standard gage, this desired position being such that the lower or contacting face of the pressure-shoe on the pressure-part is located slightly below the upper surface of the standard gage, in order that, when the standard gage is placed thereunder, the pressure-part will be slightly raised in its guide so as to raise the shoulder 94 off the shoulder 95, in order to permit movement of the pressure-part above and below the level of the upper face of the standard gage, so that such movements may be transmitted to the indicating gage, as under-dimensions or over-dimensions of the printing plates being measured. The split-bearing is clamped about the vertically movable guide when the guide has been properly positioned. It is understood that a shoe 77 or 78, or other shoe, suitable for the purpose of measuring the objects, has been secured to the lower end of the pressure-part.

When the slide and the guide have thus been adjusted, the pressure-part is raised by means of the lever 201 and the standard gage is placed under the pressure-part, which latter is allowed to then descend upon the pressure-part so as to contact the standard gage with pressure, which may simulate a working pressure to which the object to be measured is subjected under working conditions. This pressure is supplied by the spring 106. The position of the pressure-part, when thus contacting the standard gage, affects the position of the indicating finger of the indicating gage, and the shoulders 94, 95, are in spaced relation. The dial of the indicating gage is then turned, by means of turning the ring to which it is secured, on the casing of the gage, so as to position, for instance, the zero mark of the graduations on the dial in registry with the indicating finger of the gage.

The graduations of the indicating gage are preferably arranged in increasing dimensions at both sides of the zero mark. These graduations may indicate thousandths of an inch, or, if desired, ten-thousandths of an inch, depending on the accuracy with which it is desired to measure the objects. The gearing of the gage may be correspondingly arranged to effect a marked movement of the finger by a slight movement of the pressure-part.

The device is now ready for measuring the objects and to indicate the dimensions of said objects and their portions either above or below the standard thickness, that is, the thickness of the standard gage, and to indicate such variations on the indicating gage. The lever 201 having been operated to raise the pressure-part, the object to be measured is placed under the pressure-part, and the lever moved to permit descent, preferably with an easy motion, of the pressure-part upon the object being measured. The pressure-part exerts pressure upon the object, and, if the object is buckled or bent, will cause the portion of the object which is contacted by the pressure-part to be moved toward the table and to contact the supporting surface of the table.

The indicating finger will now show the variation between the portion of the object being measured which is under the pressure-part, and the true dimension of the standard gage. If the portion of the object being measured is thinner than the standard gage or under the dimensions of the standard gage, the finger on the indicating gage will move to one side of the zero mark, to indicate an under-dimension and the measurement of said under-dimension.

If the portion of the object being measured is thicker than the standard gage, the finger will move to the other side of the zero mark to indicate an over-dimension of that portion of the object being measured and the measurement of such over-dimension.

The lever for raising the presser-part is again operated, and, if it is desired to measure another portion of the object, the object is shifted under the pressure-part until such other portion to be measured is opposite said pressure-part, whereupon the lever is again moved to cause coaction of said pressure-part with said portion and to press said portion toward the supporting surface of the table, the indication of variation, if any, of said portion being indicated on the indicating gage as before. It is desirable that the pressure-part be raised before movement of the object being measured thereunder, in order to avoid injury to the object being measured, and the pressure of the pressure-part is usually so great as to prevent movement of the object thereunder unless pressure of the pressure-part is relieved.

If a curved object is to be measured, a suitable saddle is placed upon the table under the pressure-part, so that the axis of the curvature is bisected by the axis of the pressure-part, in order that the point of closest approach of the curved support to the pressure-part may be immediately under the central part of the pressure-part. A standard gage of the desired thickness is then employed between the saddle and the pressure-part to determine the axial location of the pressure-part with relation to the guide, so as to cause normal separation between the shoulders 94 and 95, as hereinbefore described with reference to the adjustment of the parts for a flat plate. The dial is set as hereinbefore described with relation to a flat object, so as to have the indicating finger register with an indicating mark of the graduations.

The pressure-part having been raised by means of the lever, the curved body, for instance, a curved printing plate, is then placed on the saddle under the pressure-part, and the pressure-part lowered, whereby any hollow or space between the backing surface of the printing plate and the supporting surface of the saddle is removed, and the portion of the curved printing plate being measured is subjected to working pressure, if desired, by means of the pressure-part. The position of the pressure-part is indicated on the indicating gage to show an under-dimension or over-dimension or a correct dimension, as hereinbefore described with relation to a flat plate.

The different portions of the curved plate may be measured by shifting the curved plate lengthwise of the axis of the saddle or laterally upon the curved supporting surface of the saddle, to bring the various portions of the printing plate which it is desired to measure under the pressure-part.

Having thus fully described my invention, what I claim as new, and desire to secure by Letters Patent, is:

1. A measuring apparatus comprising a support having a supporting surface for the object being measured, a pressure-part arranged to press the object being measured toward said surface, means for adjusting the normal distance between said pressure-part and said surface, means for regulating the space between said pressure-part and said surface for admission of the object to be measured while maintaining said last-named adjustment, guiding means for guiding said pressure-part in a path perpendicular to said supporting surface, supporting means for the latter and a gage comprising a body and an operating part constituting a pair of members one of which has operative connection with said pressure-part whereby to measure the thickness of said object when under pressure.

2. A measuring apparatus comprising a support having a supporting surface for the object being measured, a pressure-part arranged to press said object toward said surface, a guide for said pressure-part, supporting means for the latter, means for adjusting said guide and for guiding said pressure-part in paths perpendicular to said supporting surface, and a gage comprising a body portion and an operating part constituting a pair of members one of which has operative connection with said pressure-part, whereby to measure the thickness of said object when under pressure.

3. A measuring apparatus comprising a support having a plane supporting surface for the object being measured, a pressure-part arranged to press said object toward said surface, a guide for said pressure-part, guiding means for adjusting said guide perpendicular to said supporting surface, guiding means for adjusting said guide parallel with said supporting surface, means for guiding said pressure-part on said guide in a path perpendicular to said supporting surface, and a gage comprising a body and an operating part constituting a pair of members having operative connections respectively with said guides and said pressure-part, whereby to measure the thicknesses of different portions of said object when under pressure.

4. A measuring apparatus comprising a support having a supporting surface for the object being measured, a pressure-part arranged to press said object toward said surface, a guide for said pressure part, supporting means therefor, guiding means for adjusting said guide in right lines with relation to said surface, and a gage comprising a body and an operating part constituting a pair of members having operative connections respectively with said guide and said pressure-part, and said gage provided with an indicating element having operative connection with said operating part.

5. A measuring apparatus comprising a support having a supporting surface for the object being measured, a pressure-part, supporting means therefor, means causing pressing movement in a path perpendicular to said supporting surface between said pressure-part and said surface to press the object being measured toward said surface, and a gage comprising a body and an operating part constituting a pair of members one of which has operative connection with said pressure-part whereby to measure the thickness of said object when under pressure.

6. In a measuring apparatus, the combination of a support for the object being measured, a pressure-part arranged to press the object being measured toward said support, a guide for said pressure-part, supporting means for the latter, spring means supported by said guide to normally press said pressure-part toward said support, and a gage mounted on said guide comprising an indicating element and an operating element therefor having operative connection with said pressure-part whereby to measure the thickness of said object when under pressure.

7. In a measuring apparatus, the combination of a support for the object being measured, a pressure-part arranged to press the object being measured toward said support, a guide for said pressure-part, supporting means for the latter, spring means supported by said guide to normally press said pressure-part toward said support, means for adjusting said guide transversely above said table, and a gage mounted on said guide comprising an indicating element and an operating element therefor having operative connection with said pressure-part whereby to measure the thicknesses of different portions of said object when under pressure.

8. In a measuring apparatus, the combination of a frame comprising a supporting table having a plane supporting surface, a yoke rigid with relation to said frame extending above said table and comprising an upper saddle, a guideway parallel with said surface on said saddle, a cross-slide guided by said guideway, said cross-slide provided with guiding means perpendicular to said surface, a guide axially adjustable in said guiding means, a pressure-part, guiding means perpendicular to said surface between said pressure-part and said guide, means on said guide resiliently urging said pressure-part toward said table, and a gage comprising a body portion and an operating part constituting a pair of members one of which has operative connection with said pressure-part, whereby to measure the thicknesses of different portions of said object when under pressure.

9. In a measuring apparatus of the character described, the combination of a pressure-part to press the object being measured, a guide therefor, supporting means for the latter, means to press said pressure-part, a gage mounted on said guide, an operating part for said gage, and a contact-part and a spring on said pressure-part, said operating part received between said contact-part and said spring.

10. In a measuring apparatus of the character described, the combination of a pressure-part to press the object being measured, a guide for said pressure-part, supporting means for the latter, guiding means between said guide and said pressure-part, a gage mounted on said guide and comprising an actuating stem, a lever pivoted to said guide, and a contact-part on said pressure-part, said contact-part and said stem having operative connection with said lever at points substantially equidistant from the pivot of said lever.

11. In a measuring apparatus of the character described, the combination of a pressure-part to press the object being measured, a guide for said pressure-part, supporting means for the latter a gage mounted on said guide, an operating lever for said gage, a contact-part and a spring on said pressure-part for said lever, and means for adjusting said contact-part on said pressure-part.

12. In a measuring apparatus of the character described, the combination of a pressure-part to press the object being measured, a guide for said pressure-part, supporting means for the latter, a gage mounted on said guide, an operating part for said gage, a contact-part on said pressure-part for said operating part, and means for moving said pressure-part on said guide comprising a lever pivoted to said guide and provided with a contact-face for said pressure-part, said contact-face arranged to be moved by operation of said lever into substantially the line in which the pivotal axis of said lever is located and which is parallel with the line of movement of said pressure-part to automatically hold said pressure-part in actuated position.

13. In a measuring apparatus of the character described, the combination of a table having a supporting surface for the object being measured, a pressure-part arranged to press the object measured toward said surface, a guide for guiding said pressure-part, supporting means for the latter, contact-shoes having contact-faces of different forms for different objects being measured, and means for releasably securing said respective contact-shoes to said pressure-part.

14. In a measuring apparatus of the character described, the combination of a support for the object being measured, a pressure-part arranged to press said object toward said support, a hollow guide in which said presure-part has guided axial movement, a helical spring in the hollow of said guide for pressing said pressure-part, a gage on the outside of said guide, and connecting means between said pressure-part and said gage.

15. In a measuring apparatus of the character described, the combination of a support for the object being measured, a tubular guide, a pressure-part in the lower end of said tubular guide arranged to press said object toward said support, a gage secured to the outside of said lower end and having an actuating part, a cross-member between said pressure-part and said actuating part, a disk in said tubular guide, a pressure-spring in said tubular guide between said disk and said pressure-part, and means for adjusting said disk.

16. In a measuring apparatus of the character described, the combination of a support for the object being measured, a tubular guide, a pressure-part in the lower end of said tubular guide arranged to press said object toward said support, the lower end of said guide provided with a bracket, a gage on said bracket, said gage provided with an actuating part, and a lever in said bracket pivoted to said guide, said pressure-part provided with a contact-part, and said contact-part and said actuating part coacting with opposite sides of said lever at points substantially equidistant from the pivotal axis of said lever.

17. In a measuring apparatus of the character described, the combination of a frame comprising a table having a plane supporting surface, a yoke rigidly secured to said frame and extending above said table, said yoke comprising a cross-rail, a guideway on said cross-rail parallel with said supporting surface, a slide, means for adjusting said slide parallel to said supporting surface along said guideway, means for clamping said slide in adjusted positions, a tubular support, a clamp-bearing on said slide perpendicular to said supporting surface for said tubular support, said tubular support provided with a rack, a worm on said slide coacting with said rack for adjusting said tubular support axially in said clamp-bearing a pressure-part in the lower end of said tubular support, a helical spring therefor in said tubular support, an indicating gage comprising a body portion and an operating part constituting a pair of members one of which has operative connection with said pressure-part, and means on said tubular support for raising said pressure-part.

In testimony whereof, I have hereunto signed my name in the presence of two subscribing witnesses.

LESLIE W. CLAYBOURN.

In presence of—
ARMELLA C. SPAHN,
PETER C. JUNG.